United States Patent [19]

Rajala et al.

[11] Patent Number: 5,629,974
[45] Date of Patent: May 13, 1997

[54] COMMUNICATION SYSTEM PROVIDING MOBILITY MANAGEMENT INTERNETWORKING BETWEEN A C-INTERFACE RADIO SYSTEM AND AN OVERLAY MOBILE RADIO NETWORK

[75] Inventors: Jussi Rajala, Espoo; Kari Aaltonen, Järvenpää, both of Finland; Juhani Murto, Coppel, Tex.

[73] Assignee: Nokia Telecommunications Oy, Espoo, Finland

[21] Appl. No.: 558,533

[22] Filed: Nov. 16, 1995

[51] Int. Cl.[6] .................................... H04Q 7/24
[52] U.S. Cl. .................................... 379/58; 379/59
[58] Field of Search ..................... 379/58, 59, 60; 395/600

[56] References Cited

U.S. PATENT DOCUMENTS

| | | | |
|---|---|---|---|
| 5,036,531 | 7/1991 | Spear | 379/58 |
| 5,260,987 | 11/1993 | Mauger | 379/58 |
| 5,396,543 | 3/1995 | Beeson, Jr. et al. | 379/59 |
| 5,546,574 | 8/1996 | Grosskopf et al. | 395/600 |
| 5,550,896 | 8/1996 | Chavez, Jr. | 379/59 |

OTHER PUBLICATIONS

Sadaba, "Personal Communications in the Intelligent Network", British Telecommunications Engineering, vol. 9 Aug. 1990.

Goodman, "Trends in Cellular and Cordless Communications", IEEE Communications Magazine Jun. 1991.

Bellcor Sepcial Report SR–3545, Issue 1, Aug. 1995, "ISDN–Based C Interface Access for GSM (DSC 1900)".

Primary Examiner—William Cumming
Attorney, Agent, or Firm—Cushman Darby & Cushman IP Group of Pillsbury Madison & Sutro LLP

[57] ABSTRACT

A communication system providing mobility management interworking between a C-interface radio system and an overlay mobile radio network. In the first embodiment the radio system uses NCAS signalling and communicates with the SCP using the MMAP protocol. The SCP then makes the conversion to traditional MAP protocol when necessary to communicate with other network entities. The SCP takes care of the interworking between these transactions. In the second embodiment the SCP only relays the MAP operations embedded into TCAP messages transparently between the radio system RS and the overlay network element when the communication takes place between the RS and the overlay network. Thus the transaction is between the RS and the overlay network element. A Relay Protocol is needed between the RS and the SCP to carry the appropriate address information and to discriminate between the transparent MAP operations and non-transparent MMAP operations.

21 Claims, 6 Drawing Sheets

COMMUNICATION SYSTEM PROVIDING MOBILITY MANAGEMENT INTERNETWORKING BETWEEN A C-INTERFACE RADIO SYSTEM AND AN OVERLAY MOBILE RADIO NETWORK

FIELD OF THE INVENTION

This invention relates to mobile communications systems and, in particular, to mobility management between an overlay radio system having a mobile switching center and a radio system connected to local exchanges.

BACKGROUND OF THE INVENTION

Known access mobile networks are so called overlay networks, enabling the setting up of calls between mobile network subscribers and subscribers to other telecommunication networks. Network elements belonging to the mobile network are kept separate from elements belonging to other networks and in consequence of this the networks can be easily managed by different operators. The access element from the mobile network to another telecommunication network, and vice versa, is a mobile switching center MSC, through which not only calls and call-related signalling but also non-call related signalling transit.

Referring to the FIG. 1, in the European GSM network (the Global System for Mobile Communications) a base station sub-system BSS includes a plurality of base transceiver stations BTS for communicating with mobile stations MS through the radio interface and a base station controller BSC. The base station system is connected to the mobile switching center MSC, which can access location registers like a home location register HLR and a visitor location register VLR, the latter one usually being included to the MSC. The location registers are essential elements for mobility management. Using several switching centers connected with trunk lines to each other it is possible to build a mobile subscribers serving network which has large covering area.

In the overlay mobile network, the MSC is connected via SS#7 interfaces to a communication network such as a Public Switched Telephone Network PSTN or Integrated Services Digital Network ISDN and through these networks a mobile subscriber can use services offered by an intelligent network IN.

FIG. 2 depicts the known stack of protocols on the SS#7 interfaces used in communication between networks. Call-related signalling between MSC and external networks makes use of TUP for PSTN, ISUP for ISDN or national variants of these protocols. Non-call related signalling corresponds to many different protocols, which are grouped together in MAP (Mobile Application Part). All MAP protocols use the services provided by the SS#7 protocol TCAP (Transaction Capabilities Application Part), itself using the service offered by the SS#7 protocol SCCP (Signalling Connection Control Part). All these protocols use signalling transport, the lowest layer being referred to as MTP (Message Transfer Part).

Alternative approaches to build up a mobile network are also being studied. It has been proposed to utilize capacity of the ISDN network and an Advanced Intelligent Network AIN, which is specified by Bellcore in his AIN Rel.1 (Advanced Intelligent Network Release 1) and AIN Rel.2. The AIN-network is not a network separated from the ISDN communication network but it utilizes the existing ISDN-network with its transmission lines and exchanges. The physical elements of the AIN include a Service Switching Point SSP, which is a digital exchange being capable to detect calls requiring AIN-services. The services reside in a physical element called Service Control Point SCP, which contains application programs and service logic, whereas service data is stored in data bases called the Service Data Point SDP. The document GR-1299-CORE, 'Advanced Intelligent Network (AIN) 0.2 Switch- Service Control point (SCP)/Adjunct Interface Generic Requirements', published in 1993 by Bellcore in AIN Rel.1, contains Bellcore's view of application and lower layer protocol generic requirements for the interface between the local exchange LE and the SCP. GR-1299.CORE describes messages sent over that interface. The document TR-NWT-001285 'Advanced Intelligent Network (AIN) 0.1 Switch- Service Control point (SCP) Application Protocol Interface Generic Requirements', published by Bellcore, contains application layer protocol generic requirements for the LE-SCP interface. The application layer protocol is based on the ANSI Transaction Capabilities Application Part (TCAP).

In said alternative approach it has been studied a possibility to drop the MSC of the overlay GSM/DCS1900 network and connect the base station sub-system BSS directly to an ISDN/AIN switch and use its switching capabilities instead of the separate mobile switching center. The result is a radio system shown in FIG. 3. Such radio system is called a C-interface Radio System. The C-interface network architecture is described more detailed in the document ISDN-Based C Interface Access for GSM (DCS1900), Special Report SR-3546, Issue 1, Bellcore, August 1995. C-interface refers to the interface between the radio system and ISDN-network. The ISDN-based C-interface is the most important interface in this mobile network. At present, regarding mobility management no solutions and no standards exist for the C-interface but at least two types of transport options have been suggested: in the first type the radio system has access to the SS#7-signalling network so being capable to communicate with the SCP and an overlay network element directly through the SS#7 network. This first type is named later in this document as RS/SS#7-type. In the second type the radio system has no access to the SS#7 signalling network but it can communicate with the SCP using non-call associated signalling NCAS as access protocol. This second type is called RS/NCAS type later in this document. In both types, all call associated signalling i.e. call control signalling between the radio system and the local exchange LE uses as the access protocol ISDN's DSS1 (Digital Subscriber Signalling System No. 1), which is described in ANSI (American National Standard) T1.602-1989 (Layer 1 specification) and T1607-1990 (Layer 3 specification). Signalling between the local exchange LE and the SCP uses the known AIN application protocol. In the C-interface radio system the application programs in AIN Service Control Point (SCP) are used to provide the mobility management functions.

In comparison to the system shown in FIG. 1, the block RS (Radio System) in FIG. 3 includes not only some of the functions of the traditional BSC but also a part of the functions of the visitor location register VLR and the mobile switching center MSC. It takes care of many of the MSC responsibilities like hand-over related switching. The local exchange LE handles basic call process and may, according the above-mentioned second type of the radio system, support non-call associated (NCAS) signalling. It is Standard National ISDN 3 LE or some later version. SCP has ability to communicate with MAP added so it can do locating queries to HLR and locating queries to VLR. The functions of VLR are divided between SCP and RS.

In the overlay mobile network a protocol for managing the mobility of subscribers is called Mobile Application Part MAP. Also in the C-interface system a mobility protocol shall be specified between each of the radio systems RS and between each radio system RS and the service control point SCP. This protocol called Mobility Management Protocol (MMAP) is being standardized by ANSI/T1 subcommittee T1S1. The MMAP for PCS1900 will be based on MAP.

A problem in modifying an overlay network architecture to fit to the ISDN/AIN architecture is caused by the lack of MSC. For example, the known GSM network is designed to fit to the ISDN-network by means of the MSC. Another problem is caused by the lack of means for realising mobility management between the C-interface radio systems without MSC and the traditional overlay mobile network with MSC. This can be reduced to the problem how to create a mechanism for exchanging information between C-interface radio system and the MSC or another element belonging to the overlay network.

In FIG. 4 is depicted a straightforward way to solve the problem. All the RSs, MSC/VLR and HLR are connected to the global SS#7 network. Thus the RSs may be considered similar to MSC/VLR. This case may be seen equivalent to GSM case. When communicating towards an overlay network element like MSC, the C-interface radio system uses SS#7 signalling and those same protocols used in the overlay network. Also the address information like Global Titles, Subsystem Numbers, etc., it sends is similar to that of the overlay network element. This means that the hand-off and roaming operations transferred via SS#7 between two RSs and between the radio system RS and overlay network elements are standardized MAP operations or corresponding MMAP operations. Due to this the anchor RS does not need to know whether the target is MSC/VLR or another RS. Additionally, some C-interface specific MMAP protocol operations not having counterparts in the traditional MAP protocol may be defined between the radio system RS and the SCP. Also the SCP uses the MAP protocol when communicating with the HLR.

Further, SCP is not involved when the hand-off procedure is performed between network elements in SS#7 network. The MAP connections to SCP are presented here only to allow interworking with RS/NCAS entities. The hand-off and roaming procedures in this solution are considered obvious and therefore signalling flow diagrams are not presented.

OBJECTIVES OF THE INVENTION

One objective of the present invention is to provide a mobility management in a communication system comprising the C-interface system capable to access an overlay network only via SCP and using NCAS signalling and the overlay network using SS#7 signalling. The RS/SS#7 is comparable to an overlay network element in this communication system and therefore in the following the term overlay network element refers also to RS/SS#7.

Another objective is to provide means which ensure that a message sent by the overlay network element is routed exactly to that radio system element RS defined in the destination address of the message. This means that when routing a message via a plurality of SS#7 network nodes, sufficient information to uniquely identify the target RS shall be preserved in the destination address field of the message. These are essential prerequisites of the mobility management interworking between overlay network switches and the C-interface radio systems attached to local exchanges.

These protocols shall enable mobility management and so roaming and handovers between the C-interface radio systems and overlay networks as well as between different kinds of the C-interface radio systems without doing any changes in the existing overlay network elements, e.g. MSC/VLR, HLR.

SUMMARY OF THE INVENTION

In the communication system the service control point SCP has access to a common channel signalling network for sending and receiving mobility management messages by means of a first application layer protocol. The telephone switch for transmitting mobility management messages between the radio system and the service control point SCP uses a second application layer protocol. A network element having access to said common channel signalling network for sending and receiving the mobility management messages uses the first application layer protocol.

Further, in the system the service control point SCP includes a protocol conversion means for converting the first application layer protocol of the mobility management message to the second application layer protocol and vice versa. The first application layer protocol could be MAP and the second application layer protocol could be MMAP. If the second application layer protocol is both MMAP and MAP, SCP further includes a relay protocol means for either directing the incoming message to the protocol entity (MMAP) or for routing it transparently forward (MAP).

To enable the interworking, the C-interface radio system together with the associated Service Control Point SCP will act as the corresponding overlay network element like the Mobile Switching Center MSC, Visitor Location Register VLR etc. The SCP will provide the access to the appropriate signalling system like SS#7. No modifications are needed to the overlay network elements and the communicating elements do not even have to know whether the other element is the C-interface Radio System or the overlay network element. The C-interface radio system uses DDS.1 signalling, an overlay network element uses SS#7 and all the information is transferred via SCP. As to the protocols, there are in this case two alternatives depending on the role of the SCP.

In the first embodiment the radio system RS uses NCAS signalling and communicates with the SCP using the MMAP protocol. The SCP then makes the conversion to traditional MAP protocol when necessary to communicate with other network entities. There is a transaction between the RS and the SCP and when needed another transaction between the SCP and the other network entity. The SCP takes care of the interworking between these two transactions.

In the second embodiment the SCP only relays the MAP operations transparently between the radio system RS and the overlay network element when the communication takes place between the RS and the overlay network. Thus the transaction is between the RS and the overlay network element. For C-interface specific communication between the radio system RS and the SCP the MMAP protocol is used and the transaction is established between these two entities. In this second embodiment, a Relay Protocol is needed between the RS and the SCP to carry the appropriate address information and to discriminate between the transparent MAP operations and non-transparent MMAP operations.

In both embodiments the SCP communicates with the HLR using the MAP protocol. When sending a message to the radio system RS, an overlay network element uses the Radio System number (E.164 number) as a Global Title (GT) address in SS#7 network. The GT translation for this address is then defined in such a way that the message is routed to the SCP and the original address is also passed to the SCP. In translation it is essential that the number of the target radio system RS is placed to the Global Title—field of the message. The Global Title remains during routing through several nodes up to SCP and therefore the target RS is identified to the SCP, which then can relay the message to the RS.

BRIEF DESCRIPTION OF THE DRAWINGS

The invention will be described in more detail in the following with reference to the accompanying drawings, in which.

DETAILED DESCRIPTION

In the following, for convenience the expression 'Radio System RS' is used and it consists of radio stations which are named in GSM language as base stations, and a radio station controller, which performs control functions as described in the document ISDN-Based C Interface Access for GSM (DCS1900).

For clarification MMAP operations relating to the C-interface are divided into two groups: MMAP1 and MMAP2. The first group, MMAP1, consists of the operations that are pure C-interface specific. They are completely new operations without having counterparts in MAP. These operations cover the interface between the lower part of the VLR resident in the radio system RS, and the upper part of the VLR resident in SCP. Note, that the VLR is the one belonging to the C-interface system. The second group, MMAP2, contains operations that are analogous to respective MAP operations, but not necessarily having equivalent ASN.1 definitions.

Figure 1:
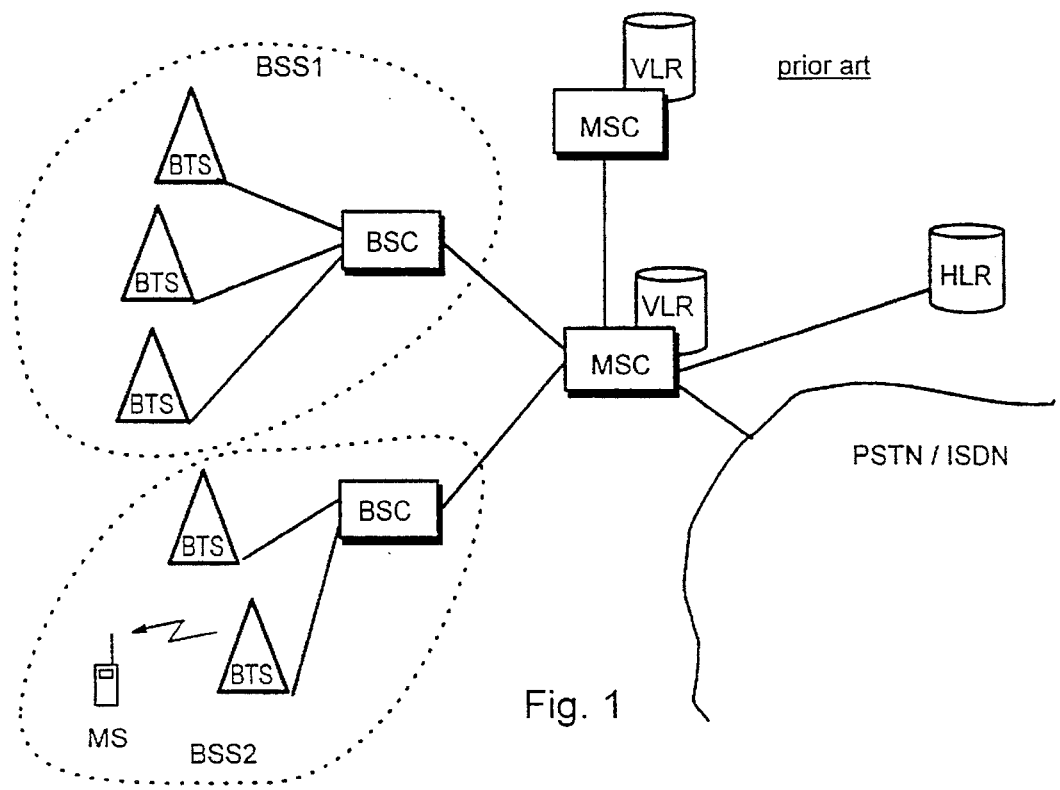
FIG. 1 depicts a typical overlay mobile network.
Figure 3:
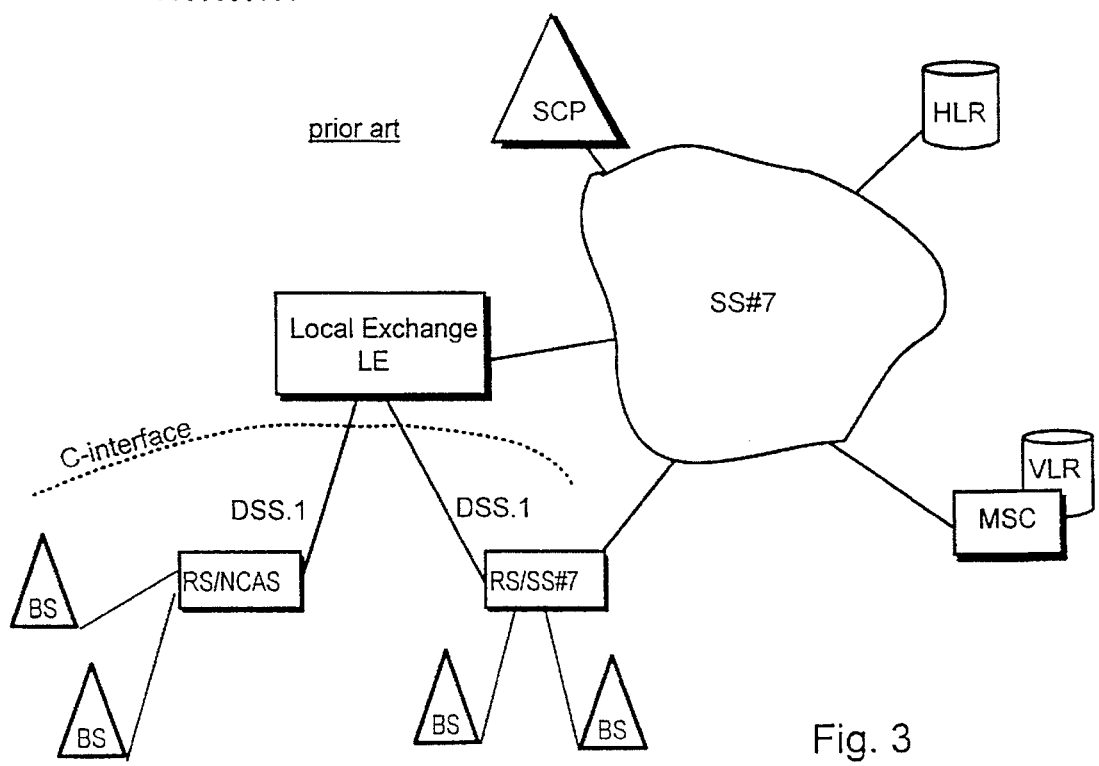
FIG. 3 depicts a C-interface mobile network.
Figure 2:
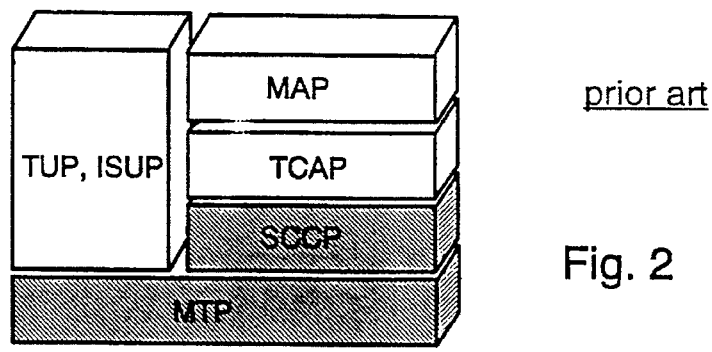
FIG. 2 shows stack of protocols on the SS#7 interfaces.
Figure 4:
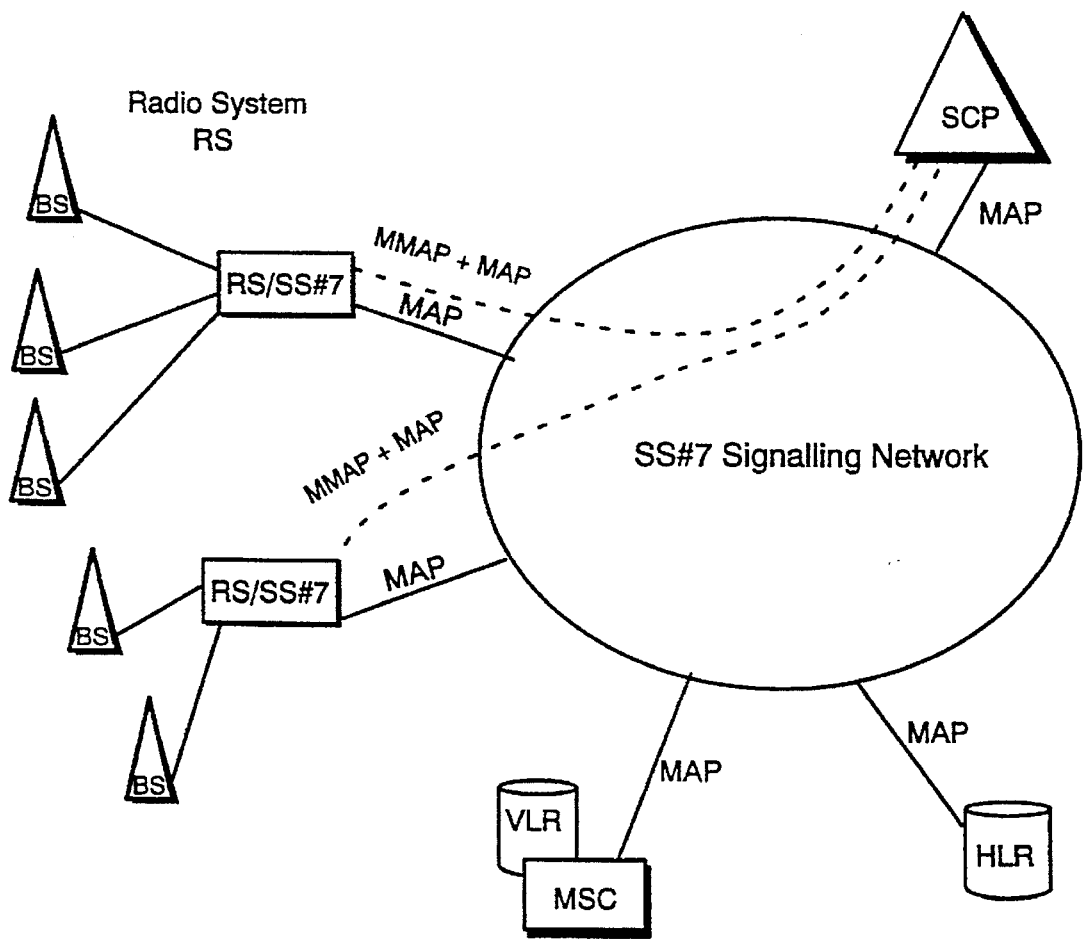
FIG. 4 depicts a known solution to connect networks;.

The basic network entities, that are involved in roaming and hand-off procedures, are the radio system RS, the home location register HLR and the mobile switching center MSC/VLR, see FIG. 3. These procedures are controlled by MAP/MMAP operations that are carried using underlying signalling networks such as SS#7 and DSS.1. Naturally there are intermediate nodes, like signalling transfer points STP and switches, that provide connections between the basic entities.

The First Embodiment

Figure 5:
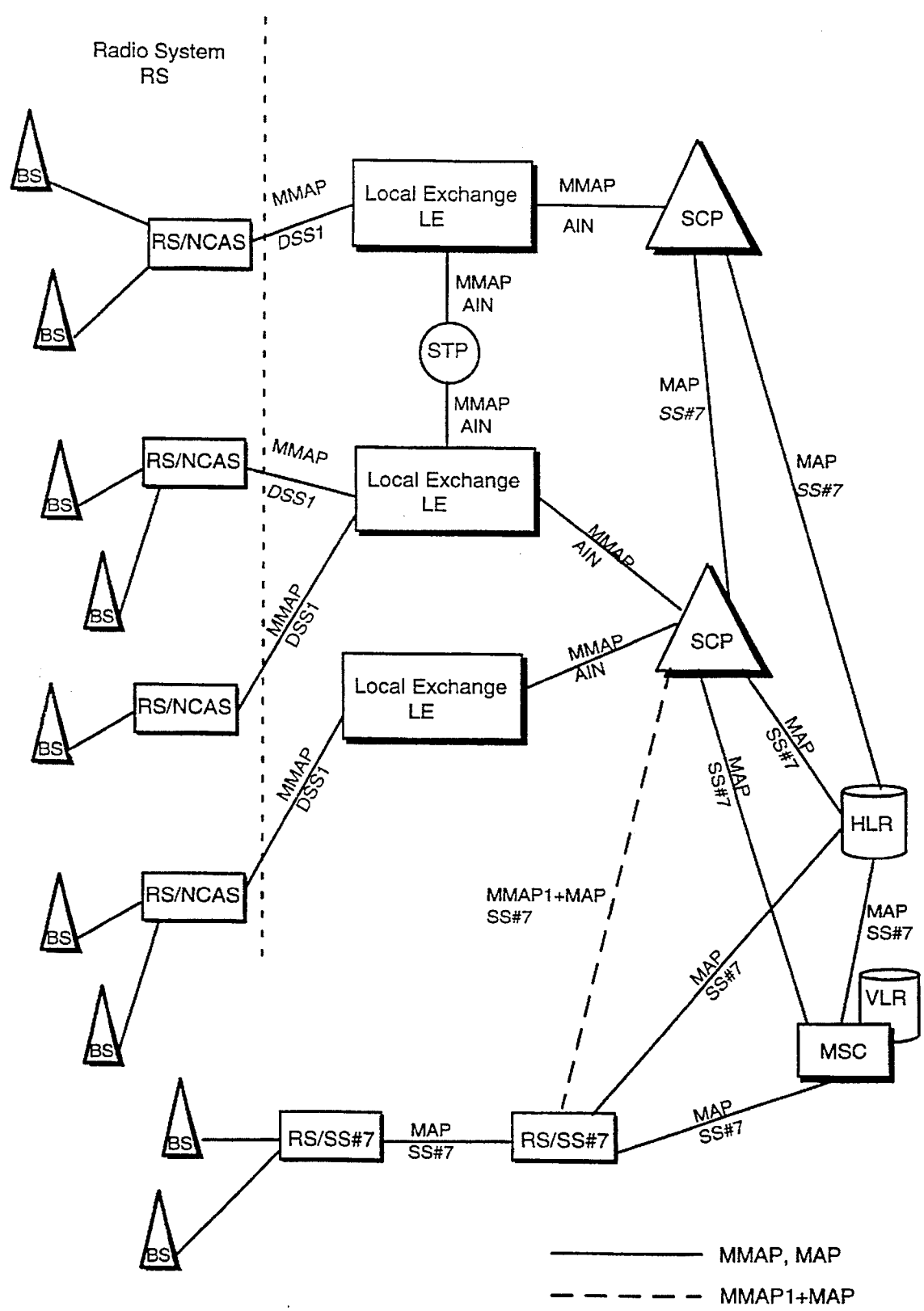
FIG. 5 depicts a network according the first embodiment.

A network according to FIG. 5 contains all the three types of radio systems, RS/NCAS, RS/SS#7 and MSC/VLR as well as other essential network elements LEs, SCPs and HLR. In this kind of a network the communication between RS/NCAS is based on NCAS signalling that could be either direct, i.e via local exchanges, or indirect, i.e. via one ore more SCPs. In the former case the SCP is not involved.

The direct signalling between RS elements is based on unidirectional approach. The initiating RS addresses the destination by giving the number of the target RS in a REGISTER message. The local exchange LE receives the message and translates it to AIN 0.2 message and sends it further to the signalling transfer point STP. The STP does the Global Title Translation in order to route the query to the target LE in AIN 0.2 network.

The indirect signalling route between two RS elements is via local exchanges LE and via one or more SCPs. The RSs does not necessary share the same SCP. This is the reason why there has to be two intermediate SCPs communicating with each other using MAP protocol on SS#7 network as shown in FIG. 5.

Figure 6:
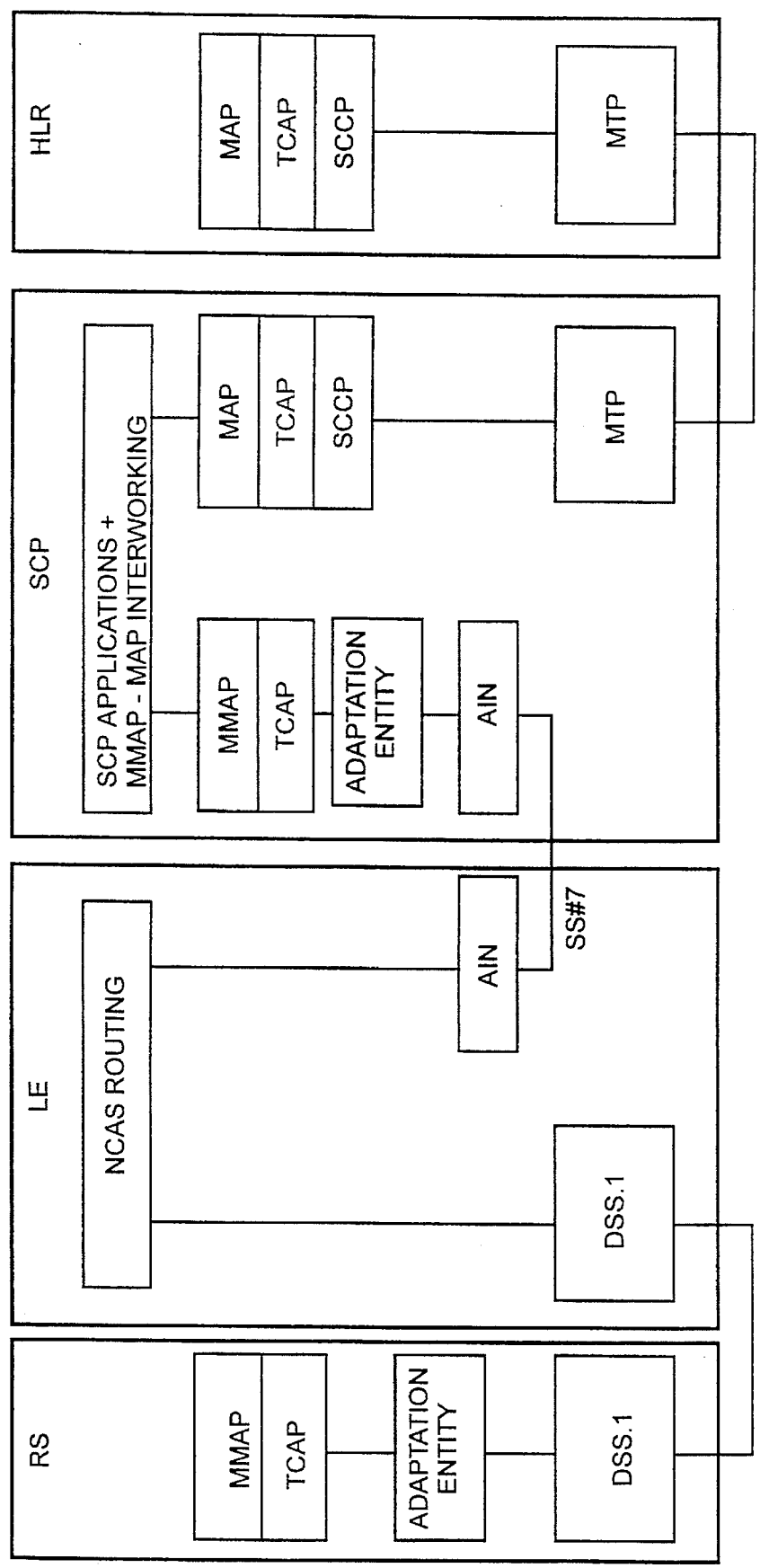
FIG. 6 illustrates protocol stack of the first embodiment.

FIG. 6 shows the protocol stack for the first embodiment in the case when the target system is a network element MSC/VLR, HLR or C-interface radio system with SS#7 interface. All the mobility management related communication from the RS takes place via the SCP using the MMAP protocol.

SCP makes the conversion between the MMAP and MAP operations. The SCP also links together the transactions between RS and SCP and the transactions between SCP and the other network entity. When a new transaction is established by the RS, the address of the target network element is associated to the initiating MMAP operation For the subsequent messages the routing information can be derived from the transaction on which they are sent. An adaptation entity is needed to map the MMAP and TCAP messages on the underlying protocol stack DSS.1 in the RS. A similar adaptation entity is needed in SCP. The adaptation entity blocks are shown in FIG. 6.

MMAP operations sent by RS have firstly to be routed via LE to SCP. SCP does the necessary routing and MMAP/MAP conversions so being the other MMAP end-point. Hence, it is a gateway between MAP and MMAP environments. This require that the MMAP operations must be slightly modified compared with respective MAP operations. There has to be added to a MMAP message an additional parameter that identifies the ISDN address of the target RS or HLR at least in the following operations: Prepare Handover (RS), Send Identification (RS) and Authentication Information Request (HLR).

The main idea behind the interworking between the C-interface system using SS#7 and the system using NCAS and network elements of the overlay network is that the SCP communicating with the RS/NCAS acts as a gateway between these two environments. As shown in FIG. 6, the MMAP protocol is used between the RS/NCAS and the SCP while the SCP communicates towards the other end in the SS#7 network using the MAP protocol. This other end may be an overlay MSC/VLR, HLR or RS/SS#7. It can also be another SCP. The only case when MMAP operations need to be transferred on SS#7 is the C-interface specific operations, i.e. MMAP1 operations between RS/SS#7 and SCP.

As a first example a query from RS/NCAS to a network element in SS#7 is considered. In this case the MMAP operation between the RS/NCAS and the SCP has to carry the ISDN address of the target network element. After receiving a MMAP-message, the SCP decodes this address information from the MMAP operation and use it as a Global Title address on the SCCP level when sending the corresponding MAP message to the target. The address parameter is only needed in MMAP operations which open a new transaction, i.e. in operations like Prepare__Handover, Send__Identification and Authentication__Information__Request.

As a second example a query from SS#7 network element to RS/NCAS is now considered. In this case the SS#7 network element sends the message with the target RS number as a Global Title Address and using the MAP protocol. With this address the message shall be routed to the SCP, which can communicate with the target RS using NCAS. It is essential that the SCP will receive the RS number in the Called Party Address of the SCP Unitdata message, even though it has been used in the STP for the Global Title Translation to get the Point Code and Subsystem Number.

On receipt of the message, the SCP does the MAP/MMAP conversion, and sends the message to LE in the AIN 0.2 operation 'NCA_Data'. The Called ID argument of this AIN 0.2 operation is populated with the target RS number. The Called Party Address on the SCCP level has to be some other number with which the message will be routed to the LE. It cannot be the target RS number, since it is reserved in the SS#7 network as a global address to route the messages to the SCP.

Thus the RS number has two functions: it has to be used to route the message to the SCP and it has to identify the Radio System in that SCP area. Note that there is no possibility to have different addresses for these two purposes when the (MAP) message is coming from an overlay MSC or VLR.

The Second Embodiment

Figure 7:
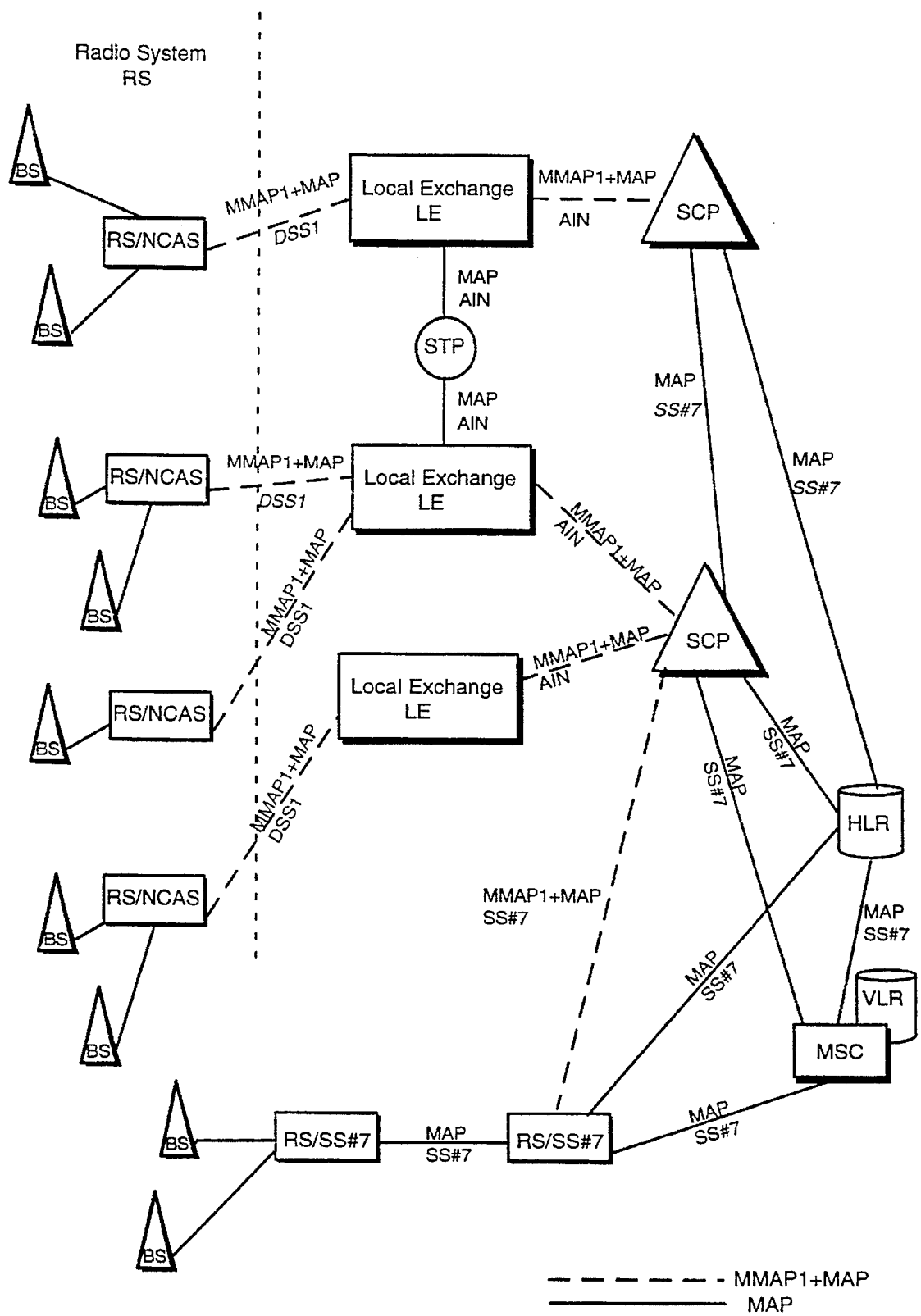
FIG. 7 shows another network according to the second embodiment.

A network according to FIG. 7 contains all the three types of radio systems, RS/NCAS, RS/SS#7 and MSC/VLR as well as other essential network elements LEs, SCPs and HLR. The network is quite similar to the network according to FIG. 5 but differs from that with regard to the application layer protocols.

Figure 8:
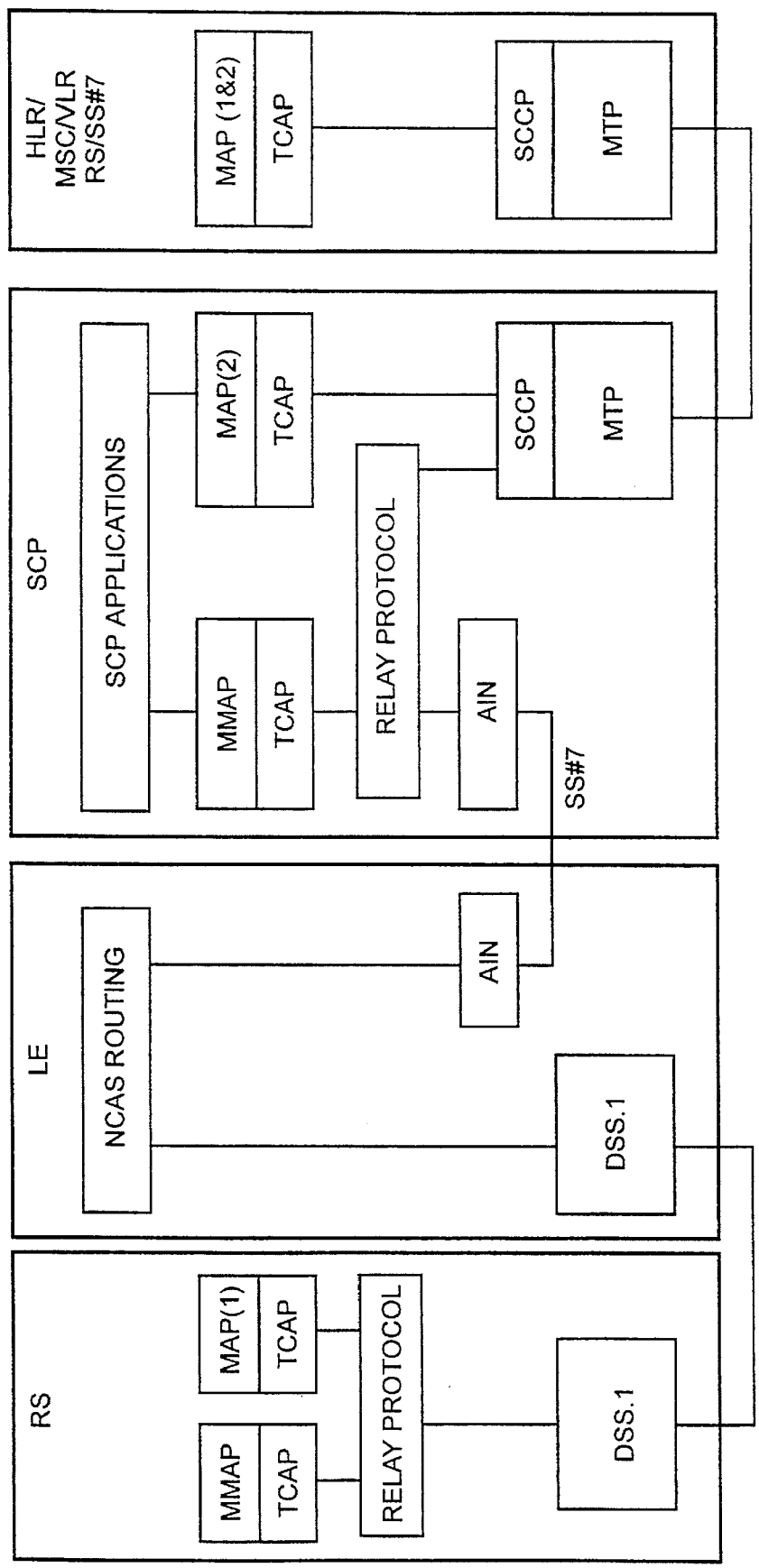
FIG. 8 shows protocol stack according to the second embodiment.

FIG. 8 shows the protocol stack in this embodiment. In this embodiment SCP provides transparent MAP services for RS. It is based on an assumption that the mobility management interfaces between C-interface network elements are similar to those in overlay network except the additional interface between the distributed VLR parts, i.e. between the RS and the SCP. Due to this the C-interface specific MMAP operations needed are those between the distributed parts of the VLR. The MMAP and TCAP protocol entities in the RS and the SCP are dedicated for this purpose. These protocols are represented by the left stack in RS-part of FIG. 8. Only the MAP operations are exchanged between the C-interface and overlay network elements. This is the first factor to provide interworking between these two networks.

To ensure that the overlay network elements remain unchanged a similar MAP protocol stack must be found from the C-interface network architecture. In the invention the stack is distributed: the upper layers, i.e. MAP and TCAP, are implemented in RS and the lower layers, SCCP and MTP, are implemented in SCP. The MAP protocol with index (2) in SCP is a standard MAP protocol used for signalling with HLR. It is presented only to provide a complete picture of the different MAP interfaces in SCP.

The MAP(1) and TCAP protocols are carried from RS to SCP, and vice versa, using NCAS signalling. The DSS.1 protocols are used between RS and LE, and AIN protocol over SS#7 between LE and SCP. The unidirectional approach is recommended in order to minimize the load of the network elements concerned. The MAP(1) operations between RS/NCAS and overlay network elements are transferred transparently via SCP.

In FIG. 8, three kind of protocol stacks in the area of interworking are depicted between C-interface and overlay network elements:

MMAP/TCAP running on NCAS signalling network (distributed VLR; C-interface)

MAP(1)/TCAP on NCAS as well as on SS#7 using SCP as a transparent gateway

MAP(2)/TCAP between SCP and HLR

As shown in FIG. 8, there is also a Relay Protocol entity (RPE) both in RS and in SCP. It has three purposes: Firstly, it performs necessary actions to map application layer protocols (MMAP, MAP and TCAP) onto DSS.1 and AIN stacks. Secondly, in RS it discriminates the incoming messages and relays them either to MMAP or MAP stack. In SCP it relays messages coming from RS either to MMAP-stack or transparently routes them forward to the SCCP stack. Thirdly, it carries addressing information for routing purposes.

SCP routes the MAP-TCAP 'bundle' (TCAP message containing MAP operation) sent by RS either to HLR, MSC/VLR or RS in SS#7 network or to another RS/NCAS. In the SCP the discriminator of the Relay Protocol denotes whether to give the embedded information in Relay Protocol frame to MMAP/TCAP entity or forward it further in SS#7 network. The Relay Protocol frame contains address information of the target system, which may be RS/NCAS, RS/SS#7 or an overlay network element.

The source RS/NCAS sets the destination address field in Relay Protocol to indicate the target overlay network element in SS#7 network. It may be a Point Code, a Sub-system Number, a Global Title (E.164 or E.212 number) or any combination of these. The Relay Protocol data unit containing the bundle is transported over NCAS network to SCP. SCP may be capable to handle different kinds of networks and addresses not only those specific for SS#7.

There is no RPE in overlay network elements. Thus there must be another way to address the RS/NCAS in overlay network elements. In SS#7 network the Global Title (GT) is used for this purpose. The target RS/NCAS is addressed at SCCP level. The target RS address is put in the Called Party Address (CdPA) field at SCCP level. The message is transmitted to associated SCP because of no SS#7 access in RS/NCAS. The Called Party Address field of the received message is mapped in SCP to the actual RS, in which case the RPE forwards the bundle to the target RS. If the Called Party Address indicates the SCP itself, the SCCP gives the message to the MAP(2) stack.

When routing the message in the SS#7 network GT translations (GTT) are performed in STP nodes. During the GTTs the information to uniquely identify the target RS shall be kept in the GT in the Called Party Address field. For example this can be ensured by defining the Routing Indicator (RI) in the results of the GTTs to indicate the GT.

We claim:

1. A communication system comprising:
   a mobile radio network including
      at least one radio system comprising a plurality of radio stations for communicating with mobile stations and a radio station controller for performing control functions;
      a service control point SCP for providing mobility management functions, the service control point SCP having access to a common channel signalling network for sending and receiving first application layer protocol messages;
      a switch for transmitting transparently second application layer protocol messages between the radio station controller and the service control point SCP;
   at least one network element having access to said common channel signalling network for sending and receiving first application layer protocol messages;
   wherein in said system:
      the service control point SCP includes a protocol conversion means for converting the first application layer protocol of the mobility management message to the second application layer protocol and for converting the second application layer protocol of the mobile management message to the first application layer protocol.

2. A communication system as in claim 1, wherein the protocol stack in the radio station controller includes an adaptation entity for mapping the second application layer protocol to the underlying signal carrying protocol.

3. A communication system as in claim 1, wherein the protocol stack in the service control point SCP includes another adaptation entity for mapping the second application layer protocol to the underlying signal carrying protocol.

4. A communication system as in claim 1, wherein the first application layer protocol is Mobile Application Part MAP and the second application layer protocol is Mobility Management Application Protocol MMAP.

5. A communication system as in claim 2, wherein the signal carrying protocol is Digital Subscriber Signalling System No. 1.

6. A communication system as in claim 1, wherein the Service Control Point SCP uses the address of the target network element as a Global Title address when sending the mobility management message to the signalling network.

7. A communication system as in claim 1, wherein transactions are performed between the radio station controller and the service control point SCP and other transactions between the service control point SCP and the network element.

8. A communication system comprising:
a mobile radio network including
at least one radio system comprising a plurality of radio stations for communicating with mobile stations and a radio station controller, a protocol stack in said controller including a first and a second application layer protocols and a relay protocol for adapting the upper layer protocols to a lower layer protocol;
a service control point SCP for providing mobility management functions, the service control point SCP having access to a common channel signalling network for sending and receiving first application layer protocol messages;
a switch for transmitting transparently first and second application layer protocol messages between the radio station controller and the service control point SCP;
at least one network element having access to said common channel signalling network for sending and receiving first application layer protocol messages;
wherein in said system:
the service control point SCP includes a relay protocol means for discriminating between the first and the second application layer protocols, and for routing the first application layer protocol messages forward.

9. A communication system as in claim 8, wherein another relay protocol means in the radio station controller discriminates the incoming mobility management message and relays it to a first or to a second application layer protocol stack.

10. A communication system as in claim 8, wherein the radio station controller sets the destination address field in the relay protocol to indicate the target network element.

11. A communication system as in claim 8, wherein the network element addresses the target radio system at lower protocol level.

12. A communication system as in claim 8, wherein the first application protocol is Mobile Application Part MAP and the common channel signalling network is SS#7.

13. A communication system as in claim 8, wherein the second application layer protocol between the radio system and the service control point SCP is Mobility Management Application Protocol MMAP on the Digital Subscriber Signalling System No.1 and on the Advanced Intelligent Network.

14. A communication system as in claim 8, wherein the second application layer protocol between the radio system and the service control point SCP is Mobile Application Part MAP on the Digital Subscriber Signalling System No.1 and on the Advanced Intelligent Network.

15. A communication system as in claim 8 or 9, wherein Mobility Management Application Protocol MMAP is running on the top of the first protocol stack and Mobile Application Part MAP is running on the top of the second protocol stack.

16. A communication system as in claim 8, wherein transactions are performed between the radio station controller and the network element.

17. A communication system as in claim 1 or 8, wherein in the network element the address of the target radio station controller is put in the Called Party Address (CdPA) field at SCCP level.

18. A communication system as in claim 1 or 8, wherein the Called Party Address field of the received mobile management message is mapped in service control point SCP to the actual radio station controller.

19. A communication system as in claim 1 or 8, wherein the network element belongs to group of network elements comprising the mobile radio network, a mobile switching center, a visitor location register, a home location register and the radio system having access to the SS#7 signalling network.

20. A communication system as in claim 1 or 8, wherein in the common channel signalling network, the target address is located into the Global Title and in a signalling transfer point global title translation is defined so that the information to uniquely identify the target radio system is kept.

21. A communication system as in claim 8, wherein the first application layer protocol between the radio system and the service control point SCP is Mobile Application Part on the Digital Subscriber Signalling System No.1 and on the Advanced Intelligent Network.

* * * * *